United States Patent [19]
Klees

[11] 3,854,286
[45] Dec. 17, 1974

[54] VARIABLE BYPASS ENGINES

[75] Inventor: Garry W. Klees, Mercer Island, Wash.

[73] Assignee: The Boeing Company, Seattle, Wash.

[22] Filed: Feb. 5, 1973

[21] Appl. No.: 329,768

Related U.S. Application Data

[63] Continuation-in-part of Ser. No. 226,850, Feb. 16, 1972, Pat. No. 3,792,584, which is a continuation-in-part of Ser. No. 196,422, Nov. 8, 1971, Pat. No. 3,779,282.

[52] U.S. Cl............... 60/204, 60/226 R, 60/226 A, 60/39.23, 60/262, 239/265, 239/29, 415/79
[51] Int. Cl............................................. F02k 3/04
[58] Field of Search............ 60/226 R, 39.23, 39.29, 60/226 A, 262; 239/265.11, 265.13, 265.17, 265.19, 265.27, 265.29, 265.33, 265.37, 265.41; 415/79

[56] References Cited
UNITED STATES PATENTS

| | | | |
|---|---|---|---|
| 2,527,732 | 10/1950 | Imbert | 60/226 R |
| 2,635,420 | 4/1953 | Jonker | 60/226 R |
| 3,263,416 | 8/1966 | Bill | 60/226 R |
| 3,316,717 | 5/1967 | Castle | 60/226 R |
| 3,520,138 | 7/1970 | Fox | 60/226 R |

*Primary Examiner*—Clarence R. Gordon
*Attorney, Agent, or Firm*—Bernard A. Donahue; Glenn Orlob

[57] ABSTRACT

Air breathing gas turbine engine design concepts, methods and apparatus for providing variable bypass and variable engine cycles. The disclosed preferred embodiments involve flow control systems for internal management of air within the engine which have a capability to crossover or invert adjacent annular flow patterns without interference, necking down, or departure from the confines of an annular passageway, and which may be switched from inverted to straight through flow.

12 Claims, 10 Drawing Figures

VARIABLE BYPASS ENGINES

FIELD OF THE INVENTION

This is a Continuation-In-Part of U.S. Patent Application Ser. No. 226,850 filed Feb. 16. 1972, entitled "Increased or Variable Bypass Ratio Engines" now U.S. Pat. No. 3,792,584 which was a Continuation-In-Part of U.S. Patent Application Ser. No. 196,422 filed Nov. 8, 1971, entitled "Annulus Inverting Valve" now U.S. Pat. No. 3,779,282. This invention relates to air breathing turbine engines and, more particularly, to methods and apparatus for providing variable engine cycles and variable bypass ratios.

BACKGROUND OF THE INVENTION

Variable bypass ratio has been a long sought goal of the aircraft engine designer. The single bypass ratio engines in use today have not realized their full performance potential in modern airplanes because the designs have been compromised to yield satisfactory performance at several flight conditions. The performance requirements at different flight conditions act to oppose one another, and the bypass ratio that is good for one condition is bad for another. One flagrant example of such an engine cycle compromise is found in current supersonic aircraft wherein a low bypass ratio is required for efficient supersonic cruise performance. As a result, very high and unsatisfactory jet noise levels are encountered in the vicinity of the airport, and subsonic performance, especially fuel consumption, is severely comprised.

Most conventional fixed bypass ratio engines proposed for supersonic aircraft have had very high installed drag characteristics during subsonic flight. This is due to the inherently high drag of supersonic inlets operating at subsonic speeds. This drag is called "spillage drag" because the inlet must spill intake airflow in excess of that required by the engine, overboard around the inlet lip. Attempts to alleviate the spillage drag problem have resulted in such expedients as the following: (1) a compromise inlet lip shape which is not optimum for supersonic flight; (2) "high flowing" the engine during a subsonic flight condition to increase the quantity of air accepted by the engine through careful selection and matching of engine components; (3) compromise in the choice of engine cycles so that the inlet airflows are more closely matched by subsonic and supersonic flight; (4) variable lip geometry; (5) flow through nacelles.

To date, variable bypass ratio engines have not been successful because they have depended upon windmilling components, retractable fans, variable area turbines, or variable pitch fans and compressors to achieve a limited range of bypass ratio variation. One such system is the "compound engine" which utilizes a pair of engines in tandem, and has a first mode of operation in which only the forward engine is used, and a second mode utilizing both engines in a supercharged fashion. The compound engine has an inherent disadvantage in that certain major components are used only on a part-time basis, thereby creating dead weight when not in use. Also, the aft engine produces substantial drag in the jet efflux of the forward engine. Other attempts to provide variable bypass have failed because the gas generator components could not be matched in all modes of operation, even where matching expedients such as variable stator blades were used in the compressor and turbine sections. Turbines, compressors, and fans must be matched for continuity of flow, rotational speed, and work so that they operate at favorable points within their operational envelopes. In the system of this invention, the components are inherently matched in either a low bypass or a high bypass mode of operation and devices such as variable area compressors and turbines are not required. However, such devices could be used, if desired, to achieve added benefits, as could many of those expedients described above with respect to the spillage drag problem.

OBJECTS OF THE INVENTION

A general object of this invention is to present solutions to several current problems in aircraft propulsion design, including but not limited to the following: (1) gross changes to the engine cycle for matching diverse operating requirements of current commercial and military aircraft; (2) a basic change to the engine cycle currently considered required for supersonic aircraft, to provide substantially improved subsonic fuel consumption and jet noise; (3) airflow management capability which can be used to create a practical variable engine cyle to improve the installed drag of the engine inlet and exhaust systems.

It is a specific object of this invention to provide a flow control system for internal management of intake and exhaust air within a turbine engine to switch the bypass ratio and engine cycle characteristics as desired for efficient performance in more than one flight regime, and to do so with minimum impact on the continuous operation of the core gas generator system.

A related specific object of this invention is to teach the use of a flow control system in a turbine engine between two adjacent rotary turbomachinery blade elements of similar size for the purpose of selectively creating a variable bypass ratio and an engine cycle which will result in improved performance of a multimission aircraft, such as a supersonic aircraft which may utilize augmentor airflow through its wing for short takeoff and landing (STOL) characteristics.

SUMMARY OF THE INVENTION

This invention is the result of continuing development work on the basic inventions disclosed in the two parent U.S. Patent Applications referenced hereinabove. This patent application should be considered to incorporate by reference all description and features contained therein, since for reasons of conciseness a detailed repetition has not been attempted here. This application discloses and claims multi-mission aircraft engines, conceptually related to those of FIGS. 15a, 15b, 18a, 18b and 18c of the parent case Ser. No. 226,850, in which the core gas generator pressure remains essentially unaffected by the position of the valve means of the invention. This is accomplished by the provision of a core passageway means for supplying intake air to the core gas generator which is independent of the flow patterns created by the valve means.

DESCRIPTION OF THE PREFERRED EMBODIMENTS

Figure 1A:
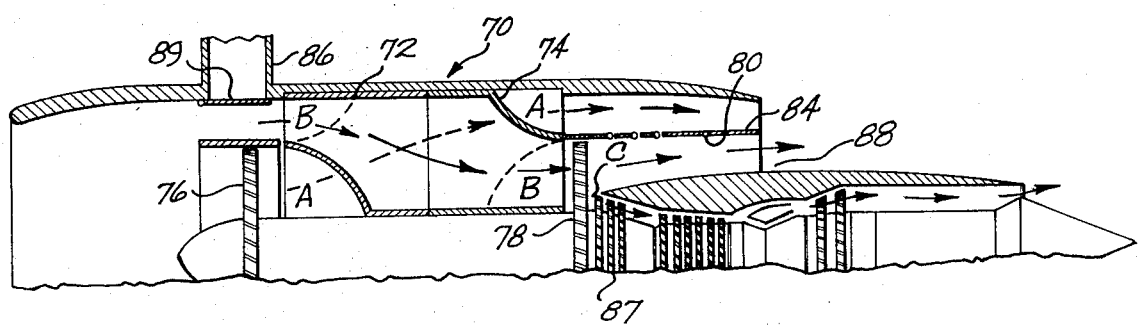
FIGS. 1a and 1b are duplications of FIGS. 17a and 17b of the parent case and show a STOL engine configuration which will generate high pressure air for augmentor wing systems such as internally blown flaps, but which will have a different core gas generator pressure depending on the valve position.
Figure 1B:
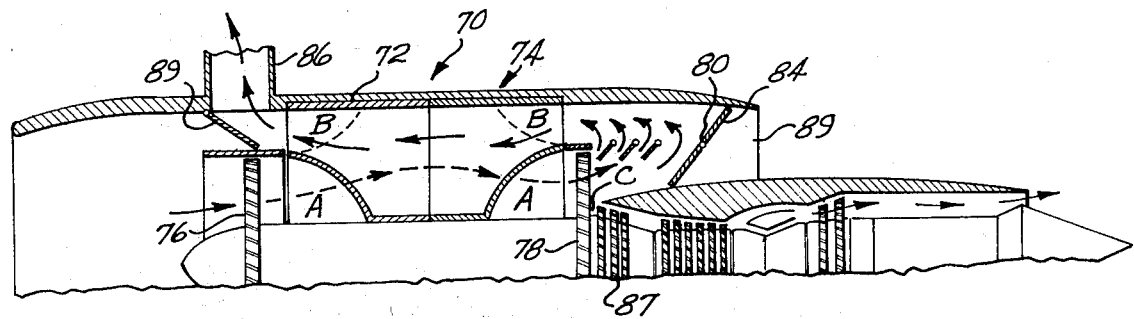
Figure 2A:
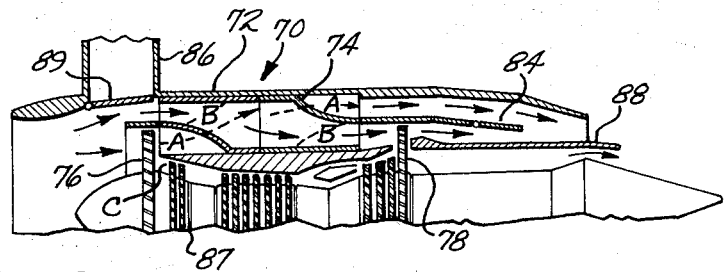
FIGS. 2a, 2b and 2c are duplications of FIGS. 18a, 18b and 18c of the parent case and present an alternate STOL configuration similar to that of FIGS. 1a and 1b but of reduced overall length and having the characteristic that the core gas generator pressure is essentially unaffected by valve position.

FIGS. 1a, 1b and 2a, 2b depict two types of turbine engines in the high and low bypass ratio positions, in which passageways are provided for direction of augmentor air in the low bypass mode to, e.g., an internally blown wing flap system. A preferred takeoff configuration (FIGS. 1b and 2b) may have a fan delivery pressure of the order of 4.0 atmospheres and a bypass ratio of 2.0. For subsonic cruise, (FIGS. 1a and 2a) a bypass ratio of 4.0 and fan delivery pressure of 2.0 atmospheres is possible with either configuration. For supersonic cruise (not shown) each configuration will return to the straight through valve position (FIGS. 1b and 2b) but blocker doors 84 and 89 will be horizontally positioned for conventional low bypass ratio operation. This type of engine in a STOL augmentor wing aircraft will compensate for the increased weight caused by the valve and augmentor air duct work, because of the capability to provide two independent functions for subsonic flight, viz., supplying high pressure augmentor air for takeoff and also lower pressure high bypass ratio air for cruise performance. The valve means 70, 72, 74 in each FIGURE is of the type fully described in the parent case referenced hereinabove. Bypass ratio is changed by rotation of the aft portion 74 of valve means 70 with respect to forward portion 72. The total valve means 70 is located between blade elements, or compressor fans. 76 and 78. A pivotal connection 80 is provided for a blocker door 84, located within nozzle 88. Door 84 is in a stowed position for climbout and cruise flight, as shown in FIGS. 1a and 2a. At takeoff, shown in FIGS. 1b and 2b, 4.0 atmosphere fan delivery air can be supplied by a combined pressure rise of fans 76 and 78, routed by the blocking action of door 84 back into the straight through valve passageway B—B, then to the collection chamber annulus formed by blocker doors 89, and into the duct 86 leading to the aircraft wing.

Because of the valve passageway used, duct 86 may be conveniently located at the forward end of the engine as shown. This forward location is convenient for wing delivery and allows passage of the duct 86 through the forward portion of the nacelle strut where the nacelle diameter can be increased with minimum boattail drag problems. Other engine configurations designed for such STOL purposes have required the use of external "horse-collar" collection chambers with substantial cruise drag penalties.

Figure 2C:
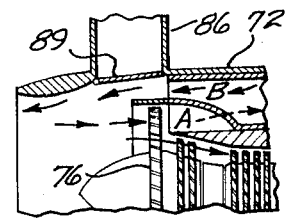

A further feature which may be readily incorporated in either the FIGS. 1 or 2 embodiment, is shown in FIG 2C. The blocker door 89 is retracted while door 84 remains in the blocker position. The valve means 70 is in the straight through mode, and therefore the flow will be routed back through and out of the inlet to spoil, and reverse, the thrust of the engine.

A primary physical difference between the engines of FIGS. 1 and 2, aside from optional duct details, is the reduction in length afforded by the forward relocation of the core engine gas generator 87 in the FIG. 2 embodiment. Engine accessibility is diminished in FIG. 2, however, and the engine requires a seal between the turbine or core gas generator flow in passageway C and the fan flow in the separate adjacent annular flow patterns A and B.

A primary functional difference, in terms of engine cycle characteristics, between the engines of FIGS. 1 and 2 resides in the fact that the core gas generator pressure ratio in passageway C is affected by the position of valve means 70 in FIG. 1, while in FIG. 2 it is not, and it will remain essentially unchanged irrespective of valve position. The configuration of FIG. 2 provides a significant advantage which allows better component matching and performance characteristics for many applications by providing a core passageway means C for supplying intake air to the core gas generator which is not affected by flow in the two flow patterns of the valve means 70. In FIG. 1 the intake air to the core gas generator is compressed either by one or both of the fans 76 and 78, dependent upon the setting of valve 70.

Figure 2B:
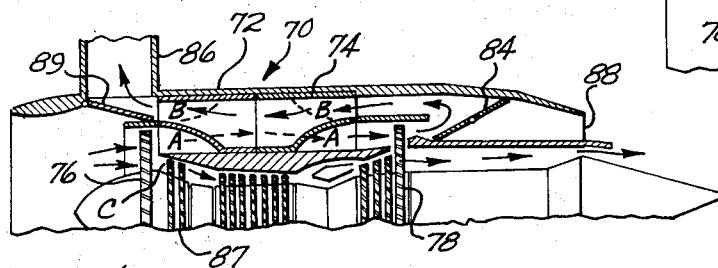
Figure 3A:
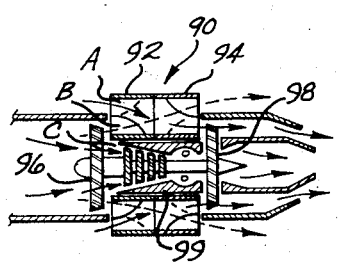
FIGS. 3a and 3b are duplications of FIGS. 15a and 15b of the parent case and schematically depict an engine of the forward and aft turbofan type shown in FIGS. 2a and 2b, but without provision for augmentor air.
Figure 3B:
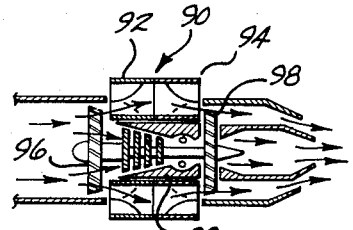

FIGS. 3a and 3b schematically depict an engine of the type shown in FIGS. 2a and 2b, wherein the duct work for augmentor air is either not provided or is not in use. The principles of operation remain generally the same, excepting that the high bypass mode (FIG. 3a) would be used for subsonic flight, and the low bypass mode (FIG. 3b) for supersonic flight. This embodiment should result in reduced spillage drags and improved subsonic fuel consumptions of the order discussed previously in connection with conventional single bypass ratio engines.

Figure 4A:
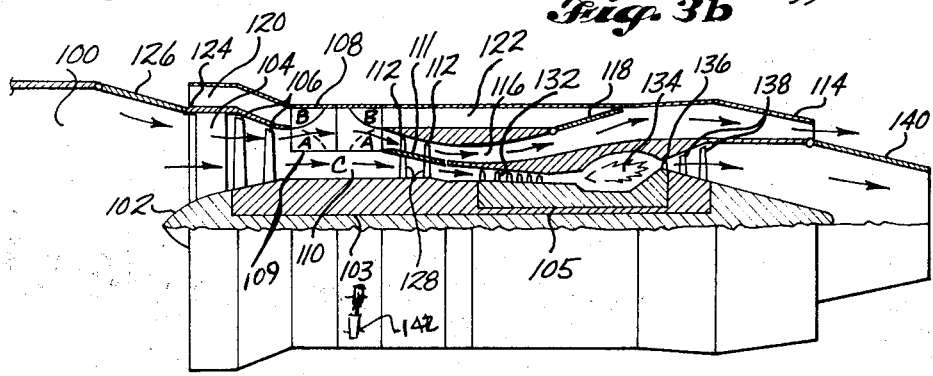
FIGS. 4a and 4b depict an alternate engine embodiment similar to FIGS. 1a and 1b in which core gas generator pressure remains constant by virtue of core passageway means located inside of a part span valve.
Figure 4B:
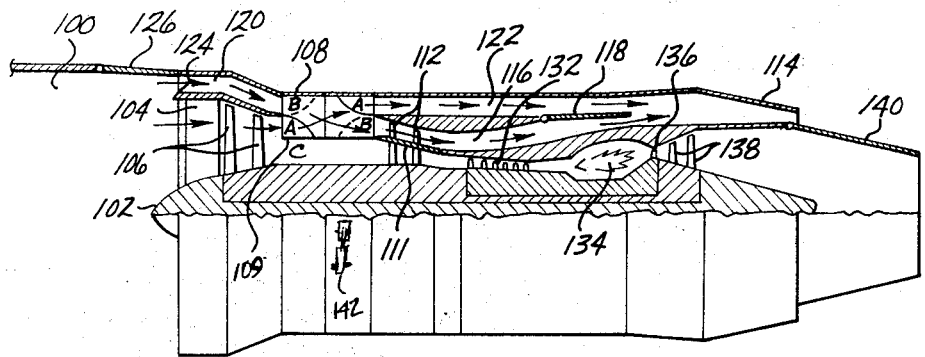

FIGS. 4a and 4b show an additional embodiment for supersonic aircraft which is designed to function in a manner similar to the embodiment of FIGS. 3a and 3b. Again, the core gas generator flow is not affected by valve position. Referring now to FIG. 4a, the engine inlet 100 supplies intake air around a centrally located housing 102 to the face region 104 of the first stage or forward fans 106. The engine shown is a two-spool type, with LP shaft 103 and a HP shaft 105. A schematically depicted annulus inverting valve system 108, of the type fully and exhaustively disclosed in the parent cases referenced hereinabove, is arranged in an annular space aft of fans 106. The valve functions as a fluid flow control system comprising means for selectively either passing flow straight through as shown in FIG. 4a, or for inverting the respective positions of two separate adjacent annular flow patterns between the entrance and exit ends of the system, as shown in FIG. 4b. The two separate flow patterns are contained within an annular space having a cross-sectional area substantially equal to the total combined area of the two adjacent flow pattern at any longitudinal location between the entrance and exit ends of the valve system 108. In the disclosed preferred embodiment, the two flow patterns have substantially equal cross-sectional areas at any longitudinal location between the entrance and exit ends. A core passageway C provides means for supplying intake air to the core gas generator in flow path 110 which is not affected by flow in the two separate flow patterns of the valve system 108. In the straight through mode of FIG. 4a, intake air is compressed by forward fans 106 and is routed through passageways C and A to the aft fans 110 which have a part span seal 111 (of a conventional type) for isolation of flow into the engine core gas generator (132, 134, 136, 138) and the nozzle passageway 116 which includes a self-actuated variable flap diffuser 118. Diffuser 118 is pivotally mounted at its forward edge to be actuated by pressure differentials between passageways 116 and 120, 122 to either close passageway 120, 122 as shown or allow it to remain open as in FIG. 4b. A conventional variable area flap nozzle 114 is provided for pressure matching for the various flight modes. In FIG. 4a passageway 120, 122 is not used. An aerodynamic flap 126 may be used to obtain an appropriate inlet flow pattern for this mode.

The flow through core passageway C, 110 enters a low pressure compressor (LPC) 128 which is formed by the inner blades of fans 112, which may or may not be similar in configuration to the outer blades on the opposite of the seal 111. The air is compressed again by the high pressure compressor (HPC) 132, prior to heat addition in burner 134. The heated gas is then passed through the high pressure turbine (HPT) 136 and the low pressure turbine (LPT) 138 before passing on through nozzle 140 which is a conventional selectively actuated flap type variable area nozzle. While the engine shown is a two-spool configuration, engines having other numbers of spools will also work in the same manner. Actuator 142 of a conventional type is used to rotatively position the valve 108 to achieve variable bypass ratio as is fully set forth in the parent cases.

Referring now to FIG. 4b, actuator 142 has rotated the forward portion of the valve 108 with respect to the aft portion and thus has changed the flow paths through the fans 106 and 112. Self-actuated flap 118 has repositioned itself at an equilibrium position where the two fans streams merge. The pressure ratio of fans 106 is normally designed to equal that of fans 112 to provide good mixing conditions at flap 118; however, some variation is permissible and there is no absolute requirement that the pressure ratios be equal. The inlet 100 supplies air to fans 106 and it is partly passed to the valve 108 and partly to the primary flow path C, 111 for the core gas generator. This path C, 111 is unchanged from the previous position, and the primary mass flow and pressure ratios of the core engine are undisturbed by the valve position and/or transition between positions. The remainder of flow from fans 106 continues through the valve 108 to duct 122, which is now open to nozzle 114. Inlet 100 also supplies air to fans 112 through the duct 120 and valve 108. The air pressurized by fans 112 travels through duct 116 to nozzle 114.

As noted previously, the valve 108 is schematically depicted and reference must be had to the parent cases for full understanding of its detailed geometric shape. However, it should be pointed out that lines 109 in some cases will merely be ridge lines from the ends of the valve to where the "triangular" sections begin, and a full cylindrical inner housing for the valve will not be required. This is particularly of interest where there is no requirement for total flow isolation between the core and valve flows, along the inner forward portion of the valve. Accordingly, in one preferred embodiment of the FIG. 4 configuration, the forward inner portion of the valve will have a generally corrugated appearance aft to the triangular section which is schematically depicted by the termination of the curved line leading from the aft edge of splitter 124. Since the pressures created by fans 106 are essentially the same in adjacent passageways A and C, absolute isolation may not be required. Furthermore, as will be apparent to persons skilled in this art, there may be an advantage in having a combined flow stream A and C for a significant distance aft of fans 106 to allow equilization of the radial pressure gradient emerging from the fan prior to actual entry into two divided flow streams at the triangular section of the valve. Also, absolute isolation of flow streams A and C requires a cylindrical wall with attendant weight and skin friction drag penalties.

Figure 5:
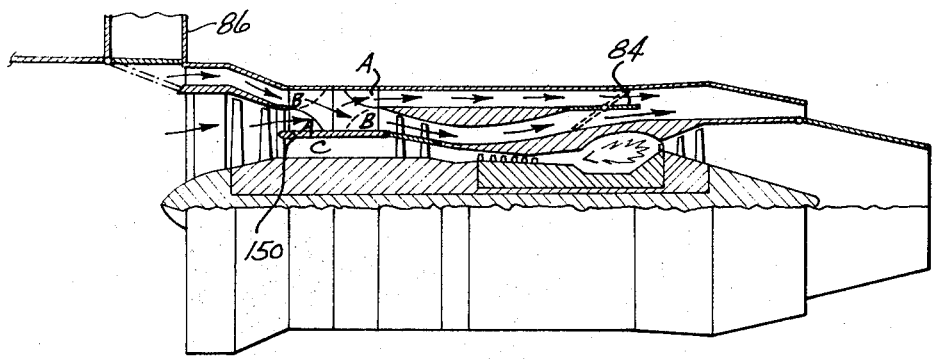
FIG. 5 illustrates an engine similar to that of FIGS. 4a and 4b, but in which optional features for augmentor air, and a part span seal are shown.

However, as shown in FIG. 5, in certain designs it may be desirable or necessary to provide a fixed cylindrical part span seal 150 which totally isolates the annular space occupied by the valve 108 from the annular space occupied by core passageway C, 110 between the valve 108 and the centrally located housing 102. In this design, the seal 150 is attached to and extends from a stator blade members just aft of front fans 106 to the movable part span seal 111. It is noted that a part span seal could also be provided on forward fans 106, in which case conventional labyrinth seals would serve to sealingly interconnect the movable and the fixed part span seals.

FIG. 5 also illustrates the ease of conversion of an engine of the type shown in FIGS. 4a and 4b, to an engine having the capability to generate augmentor air in the manner discussed in connection with FIGS. 1 and 2.

The engines which have been shown and described represent certain engine cycle variations available with the valve passageway concepts of this invention. Since the illustration is schematic expedients such as sophisticated variable area nozzles, inlets, stators, sealing and thrust augmentation devices are not shown in detail, it being understood that persons skilled in this art will incorporate them if desired, for their known additional advantages. Other embodiments and valve structure arrangements will be obvious, and no attempt is made here to describe them all. Multiple splits using more than one valve system are possible and will be feasible for some installations. A multiple valve configuration would provide the alternative of selecting a multiplicity of bypass ratios and modes of operation. A small diameter valve located downstream of the inner exit annulus of a large valve would allow a second splitting of the original flow and could be used in certain cases for further increasing the effective bypass ratio and/or the pressure ratio of the engine.

Clearly obvious modifications such as the use of an integral valve structure, i.e., one which only inverts flow patterns for higher bypass and does not switch to low bypass will be considered applicable to each embodiment shown. In fact, analysis has shown that a FIG. 5 embodiment with an integral nonmovable valve will give improved noise, thrust, and fuel consumption for early engines such as the JT3D and JT8D.

It will be recognized by persons skilled in this art that the nomenclature used herein has been altered in some respects for purposes of convenience. For example, the terminology forward fan and aft fan or forward blade element and aft blade element and first and second fans has been used to describe fan members located generally in the forward region of the engine, and usually known as "front fans." Also, reasonable equivalency of terminology should be applied wherein components such as splitters are sometimes called annular walls, and first, second and third passageways are variously described.

Modifications and improvements to the embodiments and concepts disclosed here will readily occur to persons skilled in this art in the light of this disclosure. Accordingly, it is intended in the appended claims to cover all such modifications and improvements.

What is claimed is:

1. A turbine engine having a centrally located housing containing a core gas generator, and a fluid flow control system located between a forward blade element and an aft blade element of said engine; said flow control system comprising means for inverting the respective positions of two separate adjacent annular flow patterns between the entrance and exit ends of said system, means for switching the respective positions of said two flow patterns from their inverted positions to the same respective positions at each of said entrance and exit ends; and wherein there is additionally included in said engine a core passageway means for supplying intake air to said core gas generator which provides a flow path not affected by flow in said two separate flow patterns.

2. The engine of claim 1 wherein the intake air supplied to said core gas generator has been compressed by at least one of said blade elements.

3. The engine of claim 2 wherein said two separate adjacent annular flow patterns are contained within an annular space having a cross-sectional area substantially equal to the total combined area of said two adjacent flow patterns at any longitudinal location between said entrance and said exit ends of said system.

4. The engine of claim 3 wherein said two separate adjacent annular flow patterns have substantially equal cross-sectional areas at any longitudinal location between said entrance and said exit ends of said system.

5. The engine of claim 3 wherein in a high bypass ratio mode of operation said forward blade element compresses fluid entering the innermost of said adjacent annular flow patterns, and the fluid thereby compressed is discharged at said exit end in an annular pattern surrounding said aft blade element.

6. The engine of claim 5 wherein in a low bypass ratio mode of operation said forward blade element compresses fluid entering the innermost of said adjacent annular flow pattern and the fluid thereby compressed is discharged at said exit end into the path of the aft blade element where it is again compressed.

7. The engine of claim 4 wherein said core passageway means occupies an annular region between said centrally located housing and said annular space occupied by said two separate adjacent annular flow patterns.

8. The engine of claim 7 wherein the intake air supplied to said core gas generator has been compressed by each of said blade elements.

9. A method for improving the efficiency of a propulsion engine having an annular passageway for control of propulsive fluid, said method comprising:
dividing said passageway into first, second, and third annular flow patterns such that said first flow pattern is located adjacent to, inside of, and concentric with, said second flow pattern at the entrance end of said passageway and said third flow pattern is located adjacent to, inside of, and concentric with said first flow pattern at the entrance end of said passageway;
compressing the fluid flowing into the first flow pattern;
discharging said first and second flow patterns at the exit end of said passageway in an inverted spatial relationship to that which exists at the entrance end of said passageway such that said second flow pattern is located adjacent to, inside of, and concentric with, said first flow pattern;
directing fluid in said third flow pattern into the core gas generator of said engine; and
directing fluid flowing out of said passageway into an annular bypass duct for delivery to a discharge nozzle system.

10. The method of claim 9 which further includes:
selectively changing the bypass ratio of said engine by switching the relative positions of said first and second flow patterns at the exit end of said passageway such that said first flow pattern remains located inside of and concentric with said second flow pattern.

11. The method of claim 9 which further includes maintaining the fluid in said third flow pattern at a pressure which is independent of the pressures existing in the fluid of said first and second flow patterns.

12. A gas turbine engine including compressor, burner and turbine means; a first fan driven by said turbine means; a first annular wall in the path of flow from said first fan whereby the first fan flow is divided into first and second concentric annuli; a second annular wall surrounding said first fan; a third annular wall of greater diameter than said second annular wall and defining therewith a third annulus; a second fan axially spaced from said first fan; and valve means interposed between said first and second fans defining passageways which, in a first valve position, connect said second annulus to said aft fan, whereby said first and second fans are in series, and in a second valve position defining passageways between said third annulus and said second fan and from said second annulus bypassing said second fan, whereby the first and second fans are in parallel.

* * * * *